United States Patent [19]

Goes In Center et al.

[11] 4,433,909

[45] Feb. 28, 1984

[54] PIVOTING REFERENCE EDGE

[75] Inventors: Kate Goes In Center, Loveland, Colo.; Francis J. Schell, Tucson, Ariz.

[73] Assignee: International Business Machines Corporation, Armonk, N.Y.

[21] Appl. No.: 360,309

[22] Filed: Mar. 22, 1982

[51] Int. Cl.³ .............................................. G03B 27/62
[52] U.S. Cl. ..................................... 355/75; 271/227;
271/245; 355/3 SH; 355/14 SH
[58] Field of Search ................. 355/14 SH, 3 SH, 75,
355/76; 271/227, 245, 246

[56] References Cited

U.S. PATENT DOCUMENTS

| | | | |
|---|---|---|---|
| 4,170,414 | 10/1979 | Hubert et al. | 355/3 SH X |
| 4,183,519 | 1/1980 | Harris | 271/245 |
| 4,322,160 | 3/1982 | Kobus | 271/245 X |
| 4,344,703 | 8/1982 | Nezu et al. | 271/245 X |

*Primary Examiner*—Richard A. Wintercorn
*Attorney, Agent, or Firm*—Joscelyn G. Cockburn

[57] ABSTRACT

A copying system including a pivotal document feeder disposed above the original document platen and a pivotal plate disposed along an edge of the platen. The pivotal plate functions as a reference edge to manually align documents on the platen. A control device is provided to inhibit operation of the document feeder when the plate is on the document platen or when a paper jam occurs. The device includes a nonreflective patch disposed on one surface of the plate. A reflective patch is disposed within the paper path. A photosensitive detecting assembly is disposed in spaced alignment with the paper path. When the plate is on the document platen, the photosensitive detecting assembly coacts with the reflective patch to generate a signal which inhibits operation of the document feeder. The photosensitive detector assembly coacts with the nonreflective patch to enable operation of the document feeder and to function as a paper jam detector.

20 Claims, 7 Drawing Figures

PIVOTING REFERENCE EDGE

BACKGROUND OF THE INVENTION

1. Field of the Invention

The present invention relates to a copying system, including a copier and a document feeder, in general and more particularly to the control of document feeders which feed original documents onto the document platen of the copier.

2. Prior Art

The use of reproduction machines such as copiers for reproducing copies of original documents is well known in the prior art. A typical copier includes a document platen and a plurality of processing stations. The document platen is adapted to receive an original document while the processing stations form and generate one or more copies of the original document.

Documents are registered, that is presented on the document platen either automatically or manually. For automatic presentation, a document feeder places the document on the document platen. After copying, the document is transported to a receiving tray. For manual presentation, the document is registered by hand on the document platen. After copying, the document is removed.

In order to register the documents on the platen, a gating mechanism is disposed relative to the platen. Proper registration is necessary to assure that a latent image of the entire document falls on the working area of the photoconductive surface. To this end, one edge of the document is usually aligned with the registration gate.

Most copying systems operate either in the automatic mode or the manual mode. In the automatic mode, the gating assembly and document registration are automatically controlled. In the manual mode, the gating assembly and document registration are manually controlled. Usually an operator positions the gating assembly relative to the document platen. Oftentimes the operator fails to remove the gating assembly from the platen. In the event that the document feeder is used with the gating assembly on the document platen, documents collide against the gating assembly. This usually results in a paper jam and damage to the document.

In the Eastman Kodak Ectoprint 100 Copier, the paper jam problem is solved by activating a manual switch when a manual aligning plate is on the document platen. The copier includes a pivot plate that acts as the document guide for a recirculating automatic document feeder (RADF) when the RADF is in place over the platen and is also pivotable over the platen to establish a reference edge for copying documents manually. The plate consists of a nub on one end which cooperates with a manual switch in the RADF to prevent RADF operation whenever the plate is detected to be in the reference edge establishing position (that is on the document platen).

U.S. Pat. No. 4,170,414 describes a copier having an output sensor for sensing passage of a sheet from a document platen. It includes a movable gate which is automatically activated to allow sheets to be aligned and ejected from the document platen.

SUMMARY OF THE INVENTION

It is therefore the general object of the present invention to provide a copier system capable of operating in an automatic document feed mode or a manual document feed mode and having an enhanced controller which monitors the paper path and periodically overrides or disables the automatic document feed mode.

In accordance with the invention, a convenience copier includes a document platen with a document feeder pivotally disposed above the platen. A narrow elongated plate is pivotally mounted relative to the document platen. The plate is adapted to be manually disposed in one of two positions. In one position (called the manually aligning position), the plate is placed on the document platen where it functions as a manual aligner to register sheets on the platen. In the other position (called the home position), the plate merges into the paper path which interconnects the document platen with an original document receptacle. A nonreflective surface is placed on one surface of the plate.

Similarly, a reflective surface is disposed within the paper path. The reflective surface is positioned so that when the plate is on the document platen, the reflective surface is in optical alignment with a light-emitting diode/phototransistor assembly which is mounted on the document feeder. The light which is generated by the diode is reflected by the reflective surface and the output signal from the phototransistor level is low. When the plate is pivoted into the paper path, the nonreflective surface absorbs light and the output signal level from the phototransistor is high. A controller which includes a microcomputer monitors the phototransistor assembly and generates control signals which prevent operation of the document feeder when the signal level is low and enables the operation of the document feeder if the signal level is high.

In the home position, the nonreflective surface cooperates with the phototransistor assembly and the controller to form a paper jam detector.

In another feature of the invention, an alignment scale is provided on one surface of the elongated plate. An original document is registered when one of its edges is aligned with the alignment scale.

In another feature of the invention, a means is provided to light a paper jam indicator when the document feeder is selected and the plate is in the manual position or a paper jam occurs in the paper path.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

Figure 1:
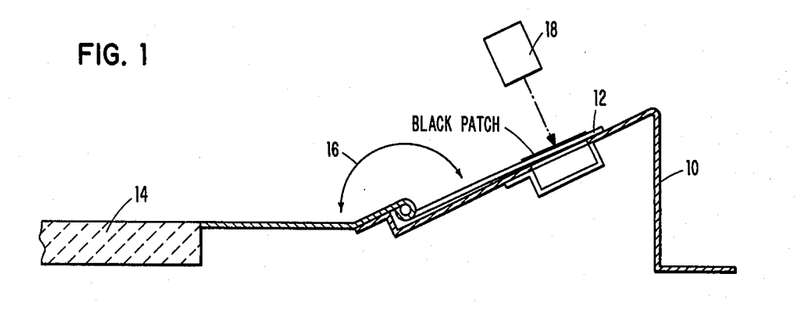
FIGS. 1 and 2 show a schematic representation of the present invention.
Figure 2:
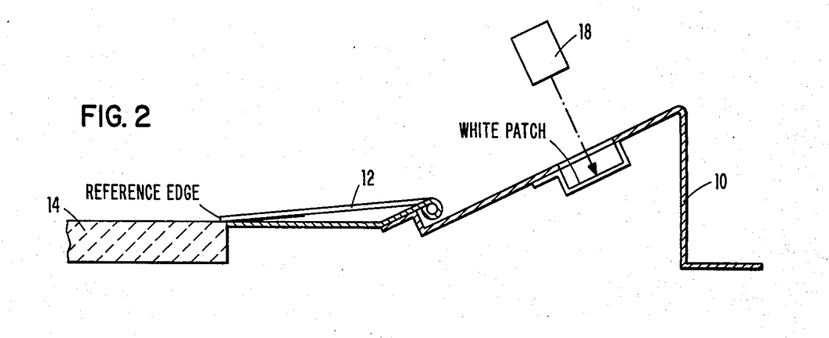

Referring now to FIGS. 1 and 2, a schematic of the manual reference edge aligner and means for indicating the position of the aligner is shown. The aligner comprises a support frame 10 and an elongated plate 12 pivotally coupled to frame 10. The support frame 10 is mounted in the paper path which interconnects the document glass 14 of a copier with an exit tray (not shown). The elongated plate is mounted so that it runs traversely to the direction of paper moving in the paper path. The elongated plate can be pivoted in the direction shown by double-headed arrow 16. In FIG. 1, the plate is shown in its home position. In the home position, the plate is not in contact with the document glass 14. A black patch on the underside of the plate coacts with the exit sensor means 18 and generates a first set of output signals. A controller means (to be described hereinafter) monitors the output of the sensor and enables an automatic document feeder (to be described hereinafter) to position documents to be copied on document glass 14.

As original documents are transported along the paper path, the time which it takes a document to clear the black patch is known. Also, the signal levels outputted from the sensor means changes from high to low from the instant the leading edge of a document covers the black patch until the trailing edge clears the black patch. By monitoring the delay between changes in signal levels, the occurrence of a paper jam is determined. The monitoring is done by the controller means which disables the automatic document feeder as soon as a paper jam is detected.

In FIG. 2, the elongated plate is pivoted about its pivot point with one of its edges positioned on document glass 14. This is the manual reference position and an operator can manually position one edge of a document to be copied against the reference edge of the elongated plate for manual copying. When the plate is in the manual position shown in FIG. 2, exit sensor means 18 coacts with a white patch disposed on the support frame to output a second set of signals. A controller means (to be described hereinafter) monitors the second set of signals and generates a control signal which disables the document feeder from automatic operation. In essence, a common device indicates the occurrence of a paper jam and the position of the manual document aligner.

Figure 3:
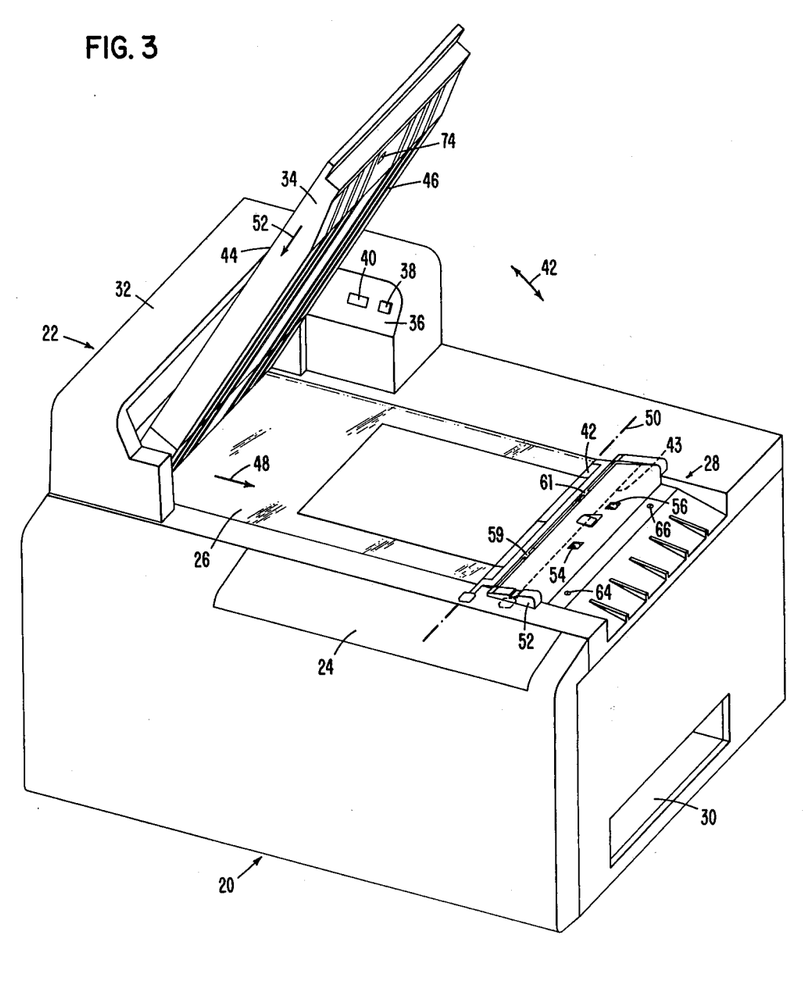
FIG. 3 shows an isometric view of a copier document feeder combination which employs the teaching of the present invention.

FIG. 3 shows an isometric view of a copier system embodying the teachings of the present invention. The copying system comprises a convenience copier 20 and a document feeder 22. The document feeder is mounted to the convenience copier. Since the combination of convenience copiers and document feeders are well known in the prior art, only those sections of the combination which are essential to the understanding of the present invention will be described.

A detailed description of the combination can be found in U.S. Pat. No. 3,910,570. The patent is incorporated herein by reference and can be consulted if necessary.

Still referring to FIG. 3, the convenience copier 20 includes an operator's panel 24. The operator's panel comprises a plurality of switches and indicators which enable a user to communicate with a copier. By way of example, an operator can select the number of copies which he desires by way of the operator's panel. If a malfunction, such as paper jams, etc. occurs within the copier, an indicator is lit to inform the operator of such malfunctioning. The copier further includes a plurality of processing stations which operates to provide copies of an original document which are positioned on the document platen 26. After copying, the original document exits through paper path 28 into a document tray (not shown). The copy of the original document is ejected through copy exit slot 30.

The internal processing station of copier 20 includes a photosensitive layer (hereinafter called a photoconductor) mounted on a rotating drum or in a belt-type configuration. An imaging station including illumination lamps, focusing elements such as optical lens and mirrors is disposed relative to document platen 26 and operable to direct a latent image of a document disposed on document platen 26 onto the photoconductor. With a latent image of an original on the photoconductor, the photoconductor is driven to position the latent image relative to a development station. The development station may be of the magnetic brush type which deposits microscopic toner onto the photoconductive surface to form a visible image on the photoconductor. U.S. Pat. Nos. 3,647,293 and 3,637,306 are examples of development stations and are incorporated herein by reference. The visible image is next transferred to a transfer station where the visible image is transferred to the surface of a recording media such as paper. The toner is then fused at a fusing station into the paper. The paper is ejected as a copy through copy access opening 30. The photoconductor is next transported to a cleaning station where the residual toner is removed. After cleaning, the photoconductor is charged to an operating potential preferably by a discharge corona and the process is then repeated. The development station and the cleaning station may be separate or combined into a single unit.

Still referring to FIG. 3, the document feeder 22 includes a tower portion 32 and a document support/transport assembly 34. The document support/transport assembly 34 is pivotally mounted to tower portion assembly 32. The tower portion assembly 32 is rigidly mounted to the frame of convenience copier 20. The document feeder 22 is mounted to convenience copier 20 so that the document support/transport assembly 34 is disposed above the document platen 26 of the copier. In addition to mounting the document support/transport assembly 34 to the copier 20, the tower portion assembly 32 includes the document feeder operator's panel 36. The operator's panel enables the user to communicate with the document feeder and includes power button 38 and jam indicator 40. When the power button is depressed, the document feeder is turned on. Likewise, if a paper jam occurs in the document feeder or along the paper path, a control means (to be described hereinafter) generates a signal which turns on the jam indicator 40. This indicator informs the operator that a jam has occurred in the original document paper path of the machine. The jam indicator is also lit when the reference edge 42 is in its manual reference position (that is on the document glass) and a user attempts to use the document feeder.

Still referring to FIG. 3, the document support/transport assembly 34 includes an original sheet receptacle tray (not shown) disposed on the top surface 44. The original sheet receptacle tray includes edge guide members which the operator sets to accommodate the size of the document which he desires to copy. The lower surface 46 of the document support/transport assembly 34 includes a transport mechanism which positions the original documents on the document platen 26 and ejects the original documents, after copying, along exit path 28 into an original sheet receptacle (not shown). Although a plurality of mechanisms can be used to position the document on the document platen, in the preferred embodiment of this invention a series of driven belts transport the document. A plurality of feed rollers (not shown) feed the document from the original receptacle around a 180° turnaround. The turnaround is disposed in tower assembly 32. The document is then transported in a direction shown by arrow 48 until the document is firmly gripped by the feed belts. As will be described subsequently, the document support/transport assembly 34 includes a gating assembly (not shown) which descends downwardly onto the document platen 26. The registration gate (not shown) contacts the document platen along the registration line 50. As the documents are positioned on platen 26, the leading edge of the documents are aligned against the descended registration gate and, as a result, a complete image of the documents is focused onto the photoconductor.

Still referring to FIG. 3, the document support/transport assembly 34 is pivotable along the direction identified by arrow 42 into a down position (not shown) or an up position. When the document support/transport assembly 34 is in the down position (not shown), the bottom surface of feed belts 46 sits parallel and in spaced alignment with the top surface of platen 26. A latching mechanism which may be a magnetic latch (not shown), latches the document support/transport assembly 34 firmly to convenience copier 20. If the manual registration gate assembly 42 is in the second position 43 (hereinafter called the home position), the document feeder is in the operable mode and will position paper on document platen 26 for copying. After copying, the document is ejected along exit path 28 into a receptacle tray (not shown).

In order to utilize the document feeder, it must be in the down position. The operator places a single document in the document receptacle tray (previously described but not shown). The operator pushes the document feed power button 38 and after a warm-up time interval, the operator feeds the document in a direction shown by arrow 52 until the leading edge of the document is grasped by the first set of feed rollers disposed in tower portion 32. The document is fed around the turnaround (not shown), then traverses along a linear path 48. At this point, the document is transported by feed belts 46. The registration gate (not shown) descends from the document feed support/transport assembly 34 in alignment with registration zone 50. The leading edge of the document is aligned against the gate and after the selected number of copies is generated on the photoconductor, the gate (not shown) is automatically receded from the document platen and the document is ejected by the feed belt over the manual registration module 52. Idler rollers 54 and 56 assure smooth movement of the sheet along exit path 28.

In the event that a user elects not to use the document feeder, the user forces the document support/transport assembly 34 in an upward direction. The document support/transport assembly then pivots about its pivot point until it is positioned in the up configuration shown in FIG. 3. The operator then pivots the manual registration gate assembly 42 until the registration edge sits on platen 26 in alignment with registration zone 50. The operator then positions the document to be copied until one edge of the document is in contact with the registration edge of registration assembly 42. The machine is then activated and after the copying, the document is manually removed. If the document support/transport assembly 34 is in the down position during manual copying of the document, it functions as a cover plate.

In the event that the registration gate assembly 42 is in the manual registration position (that is sitting on the document platen) and the user elects to use the document feeder, the present invention describes a device which inhibits the functioning of the document feeder when the manual registration gate is on the document glass. The device also operates to disable the document feeder if a paper jam occurs in the paper path interconnecting the original document receptacle tray (not shown) and the original document output receptacle tray (not shown).

Figure 4:
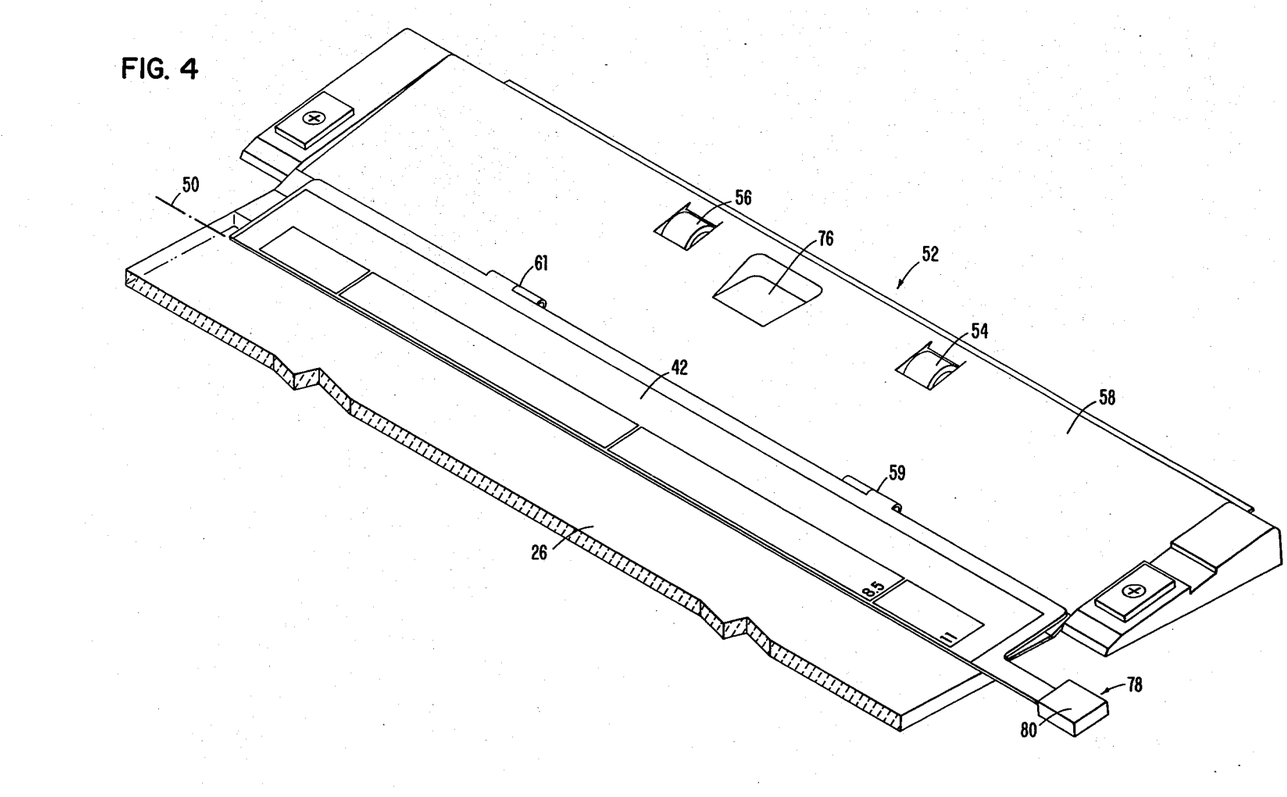
FIGS. 4 and 5 show an isometric view of the aligning plate in its aligning position and in its home position.
Figure 5:
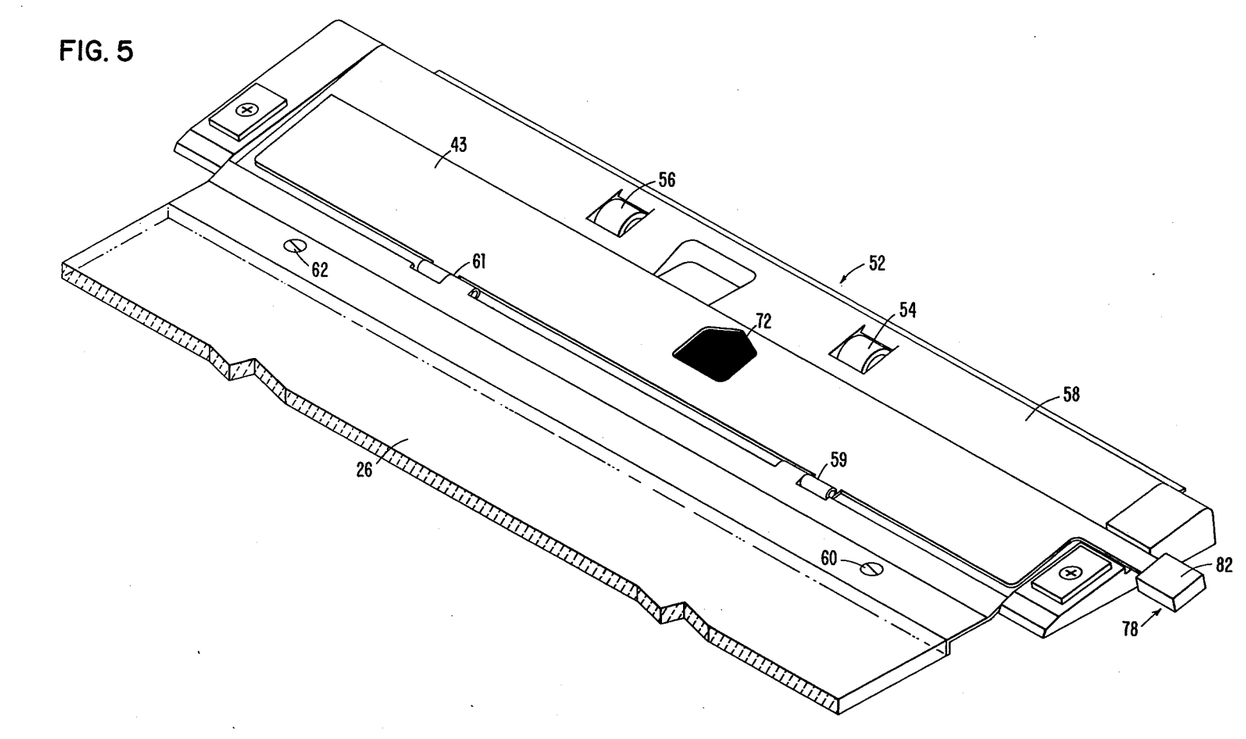

Referring now to FIGS. 3, 4 and 5, the device includes a registration module 52. The showing in FIG. 3 (solid line) and FIG. 4 shows the manual registration gate assembly 42 disposed in the manual alignment position on the document glass 26. In this position, an operator registers one edge of the document against the registration edge of assembly 42. In this position, operation of the document feeder is disabled. In the second position, the manual registration gate assembly is identified by numeral 43. In that position, the manual gate assembly is in the so-called home position and is removed from document platen 26. In this position, the document feeder will be enabled for positioning paper on the platen. However, if a paper jam occurs, the operation of the document feeder is inhibited.

Still referring to FIGS. 3, 4 and 5, the manual registration module 52 includes a support frame 58. A plurality of mounting holes 60, 62, 64 and 66 are fabricated in the support frame. The function of the mounting holes is to accept screws (not shown) which mount the manual registration module onto the frame of copier 20. In the preferred embodiment of this invention the registration module is mounted between the exit end of the platen 26 and the original output document receptacle tray (not shown). A plurality of idler rollers 54 and 56 are mounted so that their surface extends slightly above the surface of the support frame. The function of these idler rollers is to assure smooth movement of the sheet as it is ejected from the document platen. A manual registration gate assembly 42 is pivotally mounted at pivot point 59 and 61, respectively, to the support frame 58. The manual registration module 52 is mounted relative to the platen 26. The relationship is such that when the manual registration gate assembly 42 is transported (that is pivoted) from its home position shown by broken lines in FIG. 3, it rests on the document platen and the manual registration edge, against which a sheet must contact for manual alignment, coincide with registration zone 50.

The manual registration gate assembly 42 includes a relatively thin elongated plate. The plate is mounted to run traversely to the longest dimension of the platen 26. Stated another way, the elongated plate runs traversely to the direction in which a sheet is transported on the platen. The plate is fitted with a nonreflective surface 72. In the preferred embodiment of this invention, the nonreflective surface is a black patch. Of course other types of nonreflective surface can be used without departing from the scope of this invention. As will be explained hereinafter, when the manual registration gate assembly is in its home position (that is off the document platen), the black patch 72 coacts with a sensor assembly 74 (FIG. 3) to output an up-level signal. A controller, to be described hereinafter, utilizes the signal to enable operation of the document feeder. Likewise, when the manual registration gate assembly is in the manual aligning position (that is on the document platen in FIGS. 3 and 4), the optical sensor assembly 74 coacts with reflective means 76 to output a low level electrical signal. The controller utilizes the low level electrical signal to inhibit operation of the document feeder.

In the preferred embodiment of this invention, the reflective surface is a white patch disposed on the support frame 58. Of course other types of reflective surfaces, such as paint, etc., can be used without departing from the scope of the present invention.

Still referring to FIGS. 3, 4 and 5, a knob 78 is fabricated on one end of the elongated plate. The function of the knob is to enable the operator to move the elongated plate from the second position away from the platen or vice versa. As is shown in FIG. 4, a numerical scale is fabricated on one surface of the elongated plate. When the plate is on the document platen, the scale can be read and the user merely aligns the size of the sheet with one of the elected scales. This ensures proper registration when the machine is running in the manual mode.

In order to inform an operator that a paper jam occurs or the elongated plate is in the manual registration mode position (that is on the document platen), the controller, to be described hereinafter, in coaction with the optical sensor assembly, generates control signals which turns on the jam indicator 40 (FIG. 3). The jam indicator is also turned on when a paper jam occurs in the paper path.

The manual position of the manual registration gate assembly 42 is further determined by a visual indicating means. In one embodiment of the invention the visual indicating means includes a color code which is painted on knob 78. The code comprises different colors which are painted on opposite surfaces of knob 78. By way of example, when the elongated plate is in the manual registration mode (that is on the document platen), a first color painted on surface 80 (FIG. 4) is exposed to the operator. Likewise, when the elongated plate is in the home position, away from the document platen, a second color painted on surface 82 (FIG. 5) of the knob, is visible to the operator. By quickly observing the color which is exposed, the operator can tell whether the plate is on the document platen or is off the platen in its home position. In an alternative embodiment of the present invention, the knob is painted with a single color. Indicating arrows are placed on opposite sides of the knob. The arrows point in opposite directions. The direction in which the arrows point indicates the position of the plate.

Figure 6:
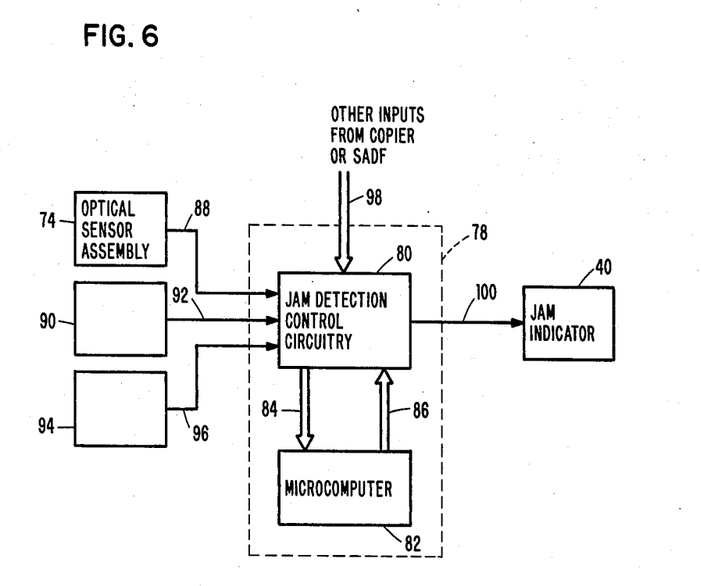
FIG. 6 shows a block diagram of the controller which monitors the paper path and disables the document feeder if the plate is in the manual aligning position (on the document platen) or when a paper jam occurs.

FIG. 6 shows a schematic of the jam detection controller. The jam detection controller 78 monitors the paper path between the semiautomatic document feeder (SADF) and the platen 26 and original output document tray (not shown) and generates control signals which inhibit automatic operation of the SADF when a paper jam occurs or when the manual reference edge assembly 42 is on the document platen. The jam detection controller 78 includes a jam detection control circuitry 80 coupled to microcomputer 82 over multiplexor buss 84. Signals from microcomputer 82 are fed back over buss 86 to the jam detection control circuitry 80. Signals from the exit path 28 (FIG. 3) are generated by optical sensor assembly 74 and are fed over conductor 88 into the jam detection control circuitry 80. Likewise, paper entry sensor 90 is similar to the optical sensor assembly 74. The paper entry sensor 90 is disposed in the SADF and outputs a signal on conductor 92 as soon as the feed rollers (not shown) contact and begin to feed a sheet out of the SADF tray. Likewise, jam sensor 94 is disposed in the SADF between the entry feed rollers (not shown) and the entry side of the document platen 26. The signal generated from sensor 94 is fed over conductor 96 into the jam detection control circuitry 80. The function of sensors 74, 90 and 94 is to monitor the paper path and to output signals indicative of paper motion along said path. Sensor 74 further informs the system of a paper jam and the position of the manual registration assembly. Other input signals from the copier or the SADF are fed over conductor 98 into the jam detection control circuitry 80. The jam detection control circuitry 80 periodically outputs a signal on conductor 100. The signal activates jam indicator 40 when a paper jam or the manual reference edge is positioned on the document platen. The microcomputer 82 may be dedicated to monitor the paper path and generate a control signal which selectively disables the SADF or in addition to that function, it might control the functions of the copier 20 and the SADF.

Any type of conventional microcomputer properly programmed, can be used to perform the task. By way of example, the Motorola 6800 microcomputer (manufactured by Motorola Corporation) or the microcomputer 43 single chip (manufactured by NEC Microcomputers, Inc.) are suitable candidates. The instruction sets and mode of operation for each of these microcomputers are available. It is, therefore, within the skill of the art to program either one of these microcomputers to control the convenience copier and the SADF singly or in combination. Since the present invention is directed to controlling the SADF so that it is rendered inoperable when a paper jam occurs and/or when the manual edge aligner is in the manual position, the description hereinafter will be limited to that effect. It should be understood that it is within the skill of the art to program the selected microcomputer to perform the other housekeeping functions which are needed for proper operation of a copier and/or semiautomatic document feeder. The single chip NEC microcomputer comprises a plurality of input ports and a plurality of output ports.

The optical sensor assembly 74 (FIG. 3) which is mounted on the document support/transport assembly 34, monitors exit path 28. As will be explained subsequently, the optical sensor assembly 74 includes a light-emitting diode and a light-receiving phototransistor. The light-emitting diode shines light onto exit path 28. If a document is not present in exit path 28 and the manual registration gate assembly 42 is in its home position (FIG. 5), the light emitting from the diode is intercepted by the nonreflective patch 72. The light is absorbed and the output from the phototransistor is high, say a logical one. If paper is in the paper path and covers up the nonreflective patch 72, the paper acts as a reflector and reflects the light back into the phototransistor. Likewise, if the registration assembly is on the document platen (that is the manual reference position), the reflective patch 76 (FIG. 4) reflects the light into phototransistor. The output from the phototransistor is low, say a logical zero. In summary, when the light is incident on a reflective surface (be it paper or the reflective patch), the output from the phototransistor is low and when the light is incident on a nonreflective surface, the output is high. This output from the phototransistor is fed into conventional shape forming circuitry position in the jam detection control circuitry 80 (FIG. 6). The pulses generated in the detection control circuitry 80 are fed over conductor 84 into the input ports of the microcomputer 82. The microcomputer then goes into a paper jam subroutine program which makes the determination whether or not a paper jam occurs. It is worthwhile noting that when the manual edge aligner mechanism is on the document platen, the output signal from the phototransistor is low and is therefore treated as a paper jam.

Figure 7:
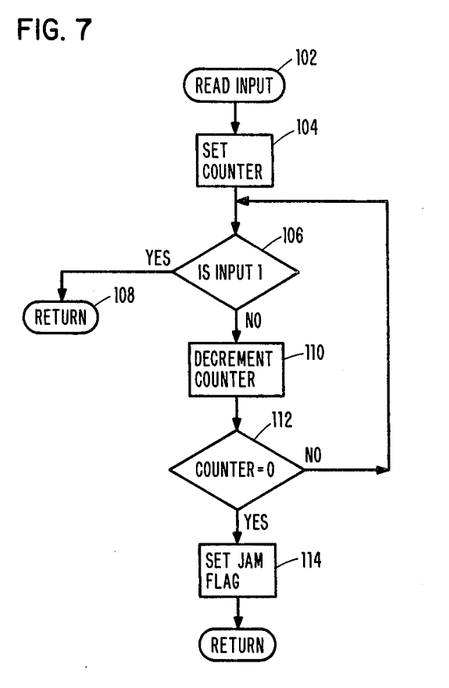
FIG. 7 shows a flowchart of a subroutine program which controls a microcomputer in the controller.

Referring now to FIG. 7, there is shown a flowchart which can be used to program the microcomputer. Of course, if the microcomputer was performing another function, the program in FIG. 7 would be a subroutine of the main program. Since the invention is not generally concerned with the overall operation of a copier system, a background overall program is not shown. Only the subroutine which is necessary for the microcomputer to keep check and to generate control signals which inhibit operation of the SADF is shown. The first step in the program is identified by block 102. The block 102 is the entry block wherein the microprocessor reads input at its input terminal. As stated previously, this input is generated by the output from the phototransistor and associated circuitry in jam detection control circuitry 80 (FIG. 6). The microprocessor enters this block when an operator pushes the power button on the SADF operator panel 36 (FIG. 3). This button forces the microcomputer into an interrupt mode wherein it examines the signals which are generated at the input port. The microcomputer next enters operational block 104. In block 104, the microcomputer sets one of its counters (CTR) to a predetermined count. The predetermined count is of a magnitude so that if a paper sheet is passing over the black patch when the manual edge aligner is in the home position, the sheet would clear the patch before the count is zero. The microcomputer then goes into decisional block 106. In block 106, the microcomputer tests to see if the input is a logical one. If it is a logical one, the microcomputer enters block 108 where it goes back to the background or main program. Incidentally, if the input is one, this means that light is not reflecting from exit path 43 and therefore there is no paper jam in exit path 28 and the manual edge registration assembly is in its home position. If the input is a logical zero (that is not one), the microcomputer enters operational block 110. In operational block 110, the count which was set in block 104 is decremented. The microcomputer then enters decisional block 112. In block 112, the microcomputer checks to see if the count is equal to zero. If it is not equal to zero, the microcomputer enters into a small loop and re-enters block 106. If the input is one, there is no jam and the manual edge aligner is in the home position and the program returns to the main or background program. However, if it is not one (that is zero), this means there is paper in the exit path or the manual edge aligner is on the glass. The program then advances through block 106, 110 and 112 and the loop continues until the count is equal to zero. When the count is equal to zero and the input is zero, the program enters block 114 where it sets the jam flag. This means that there is a jam in the paper path. It should be noted that a jam in the paper path does not necessarily mean that paper is stuck in path 28. It could well be that the manual reference edge aligner is on the platen 26. Once the jam flag is set, the program returns to the main program. With the flag set, a signal is generated which lights the jam indicator 40 (FIGS. 3 and 6) and deactivates operation of the SADF.

In an alternative embodiment of the present invention, the output from the optical sensor assembly 74, entry sensor 90 and intermediate jam sensor 94 is fed into jam detection control circuitry 80 (FIG. 6). The jam detection control circuitry 80 includes a plurality of discrete electronic circuits and combinatorial logic circuits. The logic circuits and the electonic circuits are connected to process the electrical signals outputted from the phototransistors associated with each of the sensor means and to generate electrical signals which lights up jam indicator 40 when a paper jam occurs or the manual aligner is on the document platen. The electrical signals are fed into input ports of microcomputer 82. The signal informs the microprocessor that a paper jam occurs. As pointed out before, whenever a paper jam signal is outputted, it can be interpretted as a signal indicating that the manual edge aligner is on the document platen. The signal at the microcomputer input port is used by the microcomputer to deactivate other copier functions and disable the document feeder. Stated another way, in this second embodiment, the jam detection control circuitry 80 is hard-wired logic which determines that a paper jam occurs and turns on the jam indicator and informs the microcomputer 82 of such a jam. In this embodiment, the microcomputer is merely informed of the jam; it does not actively determine that a paper jam occurred.

While the invention has been particularly shown and described with reference to a preferred embodiment thereof, it will be understood by those skilled in the art that various changes in form and details may be made therein without departing from the spirit and scope of the invention.

What is claimed is:

1. In a copier having a platen on which documents to be copied are placed, a document feeder for registering and moving documents relative to said platen, an exit path for conveying documents ejected from said platen, a sensing device responsive to the movement of a document in said exit path for producing an output signal, and controls responsive to said signals and selectively operable to cause said document feeder to function either in an enabled mode wherein said feeder automatically registers and moves documents or in a disabled mode wherein said feeder is prevented from positioning and moving documents, an improvement comprising:

a manual registration means movable between a first position displaced from said platen and a second position wherein a document reference zone is being established on the platen by the manual registration means;

a position sensing means including the sensing device disposed relative to the exit path and operable to produce output signals; and a control means including the controls responsive to the signals and operable to cause establishment of the disabled mode when the plate is in the second position.

2. The improvement of claim 1 wherein the manual registration means includes a thin elongated plate disposed traversely to the direction of paper movement in the exit path.

3. The improvement of claim 1 wherein the position sensing means includes a light-emitting source and a light-receiving source.

4. The improvement of claim 1 wherein the control means cause establishment of the disabled mode when a document jam occurs in the exit path.

5. In a copier having a platen on which documents to be copied are placed, a document feeder for positioning and moving documents relative to said platen and having means for ejecting documents into an exit path and controls selectively operable to cause the document feeder to operate either in an enabled mode wherein said feeder automatically positions and moves documents or in a disabled mode wherein said feeder is prevented from positioning or moving document, an improvement comprising:
  a plate movable between a first position displaced from said platen and a second position wherein an edge of said plate establishes a position on the surface of said platen for locating an edge of a document to be copied;
  a sensor assembly including a light source for directing light towards said document exit path and a light detector responsive to light reflected from said exit path for producing an output signal;
  first means disposed in the exit path and operable to reflect the light;
  second means disposed on said plate and operable when the plate is in the first position to prevent the light from being reflected from the first means; and
  third means operable to couple the output signal to said controls for maintaining said feeder in the disabled mode.

6. The improvement of claim 5 further including a knob fixedly mounted on one end of said plate and operable to be manually grasped to move the plate.

7. The improvement of claim 6 further including color codes disposed on opposite surfaces of the knob and operable to indicate when the plate is in the first or the second position.

8. The improvement of claim 5 further including a scaler means disposed on the plate and operable to align variable size documents.

9. The improvement of claim 5 further including an illumination means coupled to the third means and operable to emit light when the document feeder is in the disabled mode.

10. The improvement of claim 5 wherein the first means includes a reflective surface.

11. The improvement of claim 5 wherein the second means includes a nonreflective surface.

12. In a copier having a platen adapted to support a document during copying, a document feeder coupled to said copier and operable to be in a disabled mode wherein documents are being positioned manually on the platen, an improved device operable to control the document feeder, said device comprising:
  a plate movable between a first position displaced from said platen and a second position wherein an edge of said plate establishes a reference position on the surface of said platen for locating an edge of a document to be copied;
  a light sensitive means associated with an exit path;
  a sensor assembly including a light source for directing light towards said light sensitive means and a light detector operable to monitor the light sensitive means and to generate a single level signal and a multilevel signal; and
  a control means responsive to the signals and operable to cause the document feeder to be in the disabled mode either when the plate is in the second position and/or when a paper jam occurs in the document paper path.

13. The improved device of claim 12 wherein the plate is attached at the side of said platen for pivotal movement between the first and the second position.

14. The improved device of claim 12 wherein the light sensitive means includes a light reflective patch disposed in said exit path and operable to reflect light into the light detector when the plate is in said second position; and
  a light absorbing patch mounted on the plate and operable to absorb light emitting from the light source when the plate is in the first position.

15. A manual alignment mechanism operable to align and register original documents on the document platen of a copier, said mechanism comprising:
  a support means operable for mounting in the original document path of the copier;
  an alignment plate pivotally mounted to the support means and operable to be in a second position wherein said plate is in contact with the document platen when documents are placed on said platen manually and in a first position wherein said plate is not in contact with the platen when documents are placed thereon automatically.

16. The alignment mechanism of claim 15 further including a nonreflective patch mounted to the alignment plate.

17. The alignment mechanism of claim 16 further including an alignment scale mounted on the aligner plate.

18. The alignment mechanism of claim 17 further including a reflective patch mounted on the support means.

19. The alignment mechanism of claim 15 further including a visual indicating means coupled to the alignment plate and operable to indicate the position of the alignment plate.

20. In a copier having a platen on which documents to be copied are placed, a document feeder for positioning and moving documents relative to said platen, an exit path on which documents ejected from said platen by said feeder travel, a switch responsive to the presence of a document in said exit path for producing an output signal, and controls selectively operable to cause said document feeder to function either in an enabled mode wherein said feeder automatically positions and moves documents or in a disabled mode wherein said feeder is prevented from positioning and moving documents, and a plate movable between a first position displaced from said platen and a second position wherein an edge of said plate establishes a reference on the surface of said platen for locating an edge of a document to be copied, an improvement comprising:
  means operable when said plate is in said second position for causing said switch to produce said output signal, said controls responding to said switch output signal for causing establishment of said disabled mode for said feeder.

* * * * *